UNITED STATES PATENT OFFICE.

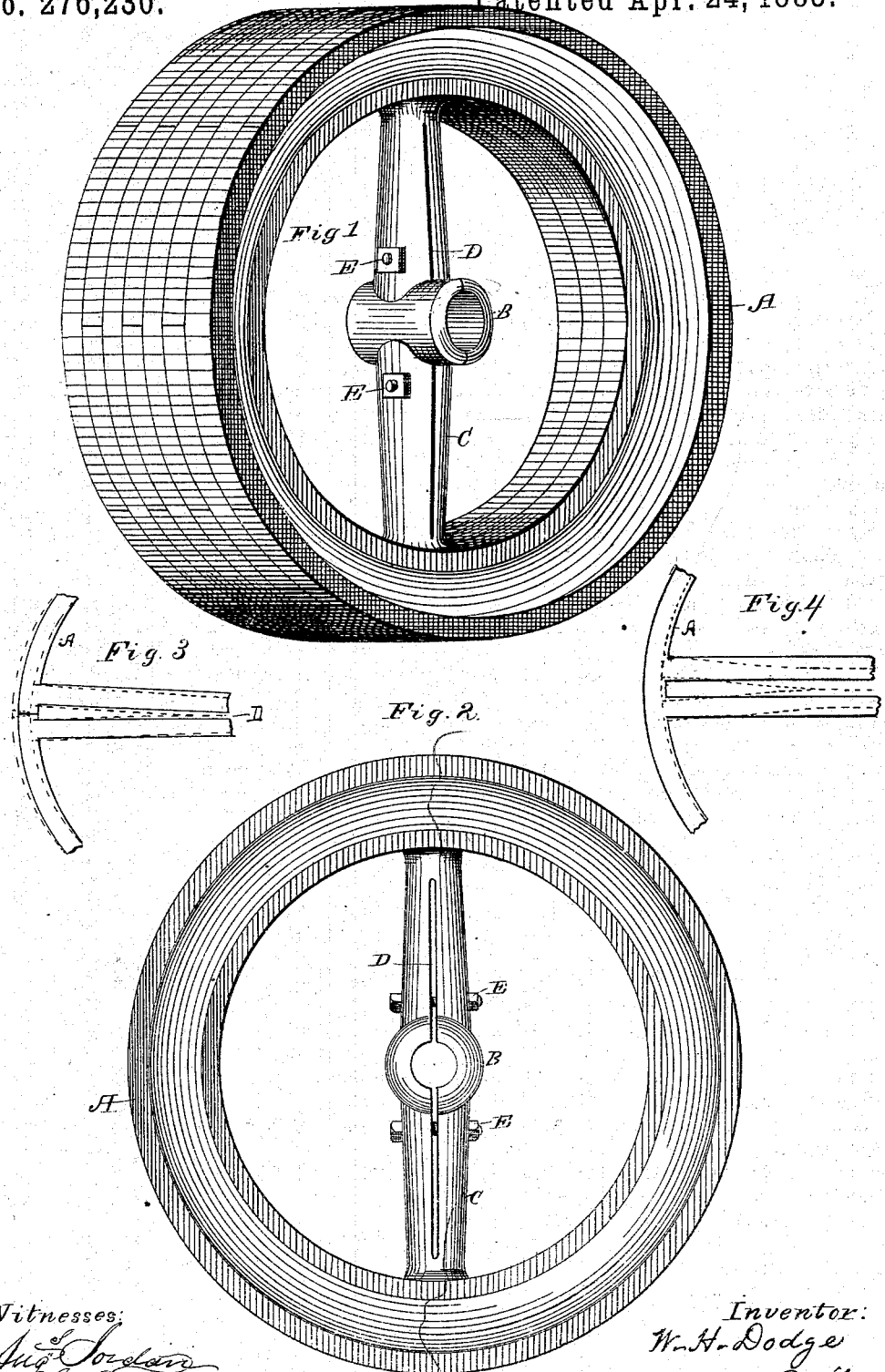

WALLACE H. DODGE, OF MISHAWAKA, INDIANA.

BAND-PULLEY.

SPECIFICATION forming part of Letters Patent No. 276,230, dated April 24, 1883.

Application filed March 3, 1883. (No model.)

*To all whom it may concern:*

Be it known that I, WALLACE H. DODGE, of Mishawaka, St. Joseph county, in the State of Indiana, have invented a new and useful Improvement in Band-Pulleys; and I do hereby declare that the following is a full and accurate description of the same.

My improvement relates to solid-rim pulleys, and has reference wholly to the structure of the hub, whereby it is rigidly attached to the shaft whereon it is mounted.

Heretofore solid-rim pulleys have generally been secured in place by set-screws bearing against the shaft. I am aware, however, that the ends of the pulley-hub have been slit and frictional adhesion secured by pressing the slit ends of said hub together upon the shaft. I am aware, also, that things have been secured to a cylinder by frictional adhesion, said thing being slit through bearing upon the cylinder, and the parts drawn forcibly upon said cylinder by a clamping-bolt. The general principle of my improvement, therefore, is not new and is not claimed herein; but I am not aware that a solid-rim pulley has ever been provided with a slit extending centrally through its hub in the plane of the axis, and extending in both directions outwardly from said axis, whereby when the parts of the equally-divided hub are forced together by clamp-bolts they will contact with the shaft over their whole surface, and the deflection thereby caused will be distributed over the whole perimeter of the solid rim.

I am also aware that a divided or separable pulley has been constructed with a hub divided in the manner indicated above, so as to clamp upon the shaft; but there is this important difference between said pulley and this, viz: The deflection of the hub in clamping upon the shaft will cause the meeting ends of the rim to protrude, so that the circular figure of the perimeter will be thrown out of truth.

Having now set out the nature of my invention, I will more particularly describe its construction, having reference to the accompanying drawings, wherein—

Figure 1 shows said invention in perspective. Fig. 2 shows the same in elevation. Figs. 3 and 4 are diagrams to illustrate effects described.

A is the rim of my pulley, solid and continuous. Its hub B and arms C may be cast integral with the rim A, or they may be separately made and secured to the rim in some proper manner. The pulley, moreover, may be made of any proper material. A slit, D, is made through the hub in the plane of the axis, and extends outward from the axis to an equal distance on both sides, into the opposite arms, as shown. Clamp-bolts E E are inserted through the slit arms close to the hub, and when the pulley is in place they are tightened up, and the hub is thereby clamped to the shaft. This method not only secures the superior adhesion due to extended surface contact, but it leaves the shaft entirely uninjured, and when it is desired to shift the position of the pulley and the bolts E are slackened the hub expands so as to leave it perfectly loose and free upon the shaft.

Figs. 3 and 4 illustrate the effects of deflecting the separated parts of spokes or arms upon a solid and upon a continuous rim.

Having described my improvement, what I claim as new is—

A band-pulley having a solid continuous rim, A, and a hub, B, having a slit, D, in the plane of the axis, and extending to an equal distance on either side thereof into the two opposite radial arms C, and the clamping bolts E, close to the hub, substantially as and for the purpose set forth.

WALLACE H. DODGE.

Witnesses:
R. D. O. SMITH,
I. C. TURNER.